July 8, 1947.  S. COLLITO, JR  2,423,684
SPHERICAL BEARING DEVICE

Filed Nov. 1, 1945

INVENTOR.
SAMUEL COLLITO JR.
BY Harry Cohn
ATTORNEY

Patented July 8, 1947

2,423,684

UNITED STATES PATENT OFFICE 2,423,684

SPHERICAL BEARING DEVICE

Samuel Collito, Jr., Newark, N. J.

Application November 1, 1945, Serial No. 626,152

5 Claims. (Cl. 308—72)

This invention relates to spherical bearing devices.

One object of the invention is to provide a spherical bearing device which comprises an inner bearing member having an axial opening in which a sleeve is fitted for a shaft or spindle which may be slidably and/or turnably mounted, said sleeve preferably extending beyond the opposite side edges of said inner bearing member and of the outer bearing member. In this connection, a further object of the invention is to provide a sleeve which has a part which engages the adacent side edge of the inner bearing member when said sleeve is moved into the axial opening of the inner bearing whereby to prevent the sleeve from being driven too far through said opening in the operation of assembling said sleeve with the inner bearing member.

A further object is to provide a sleeve having a part which forms a continuation of and thereby increases the area of the spherically convex bearing surface of the inner bearing member.

A yet further object is generally to improve the construction of spherical bearing devices.

The above and other objects, features and advantages of the invention will be fully understood from the following description considered in connection with the accompanying illustrative drawings.

Figure 1:
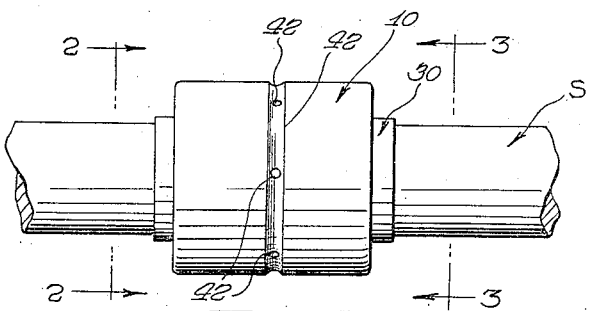
Fig. 1 is a side view of a spherical bearing device embodying the present invention.
Figure 2:
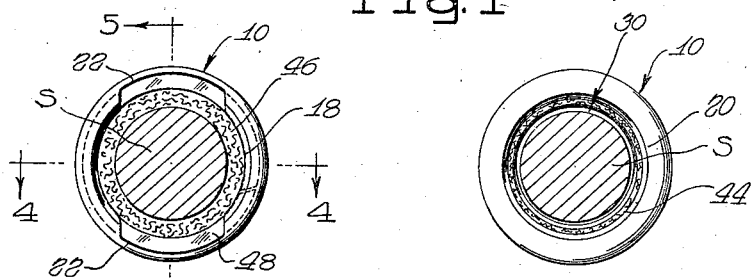
Fig. 2 is a sectional view on the line 2—2 of Fig. 1.
Figure 3:
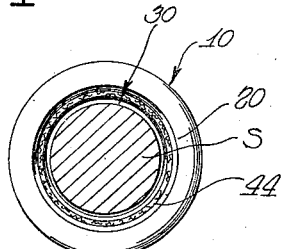
Fig. 3 is a sectional view on the line 3—3 of Fig. 1.
Figure 4:
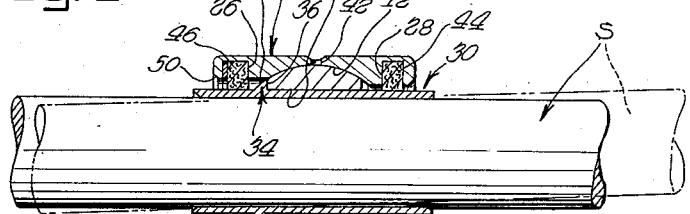
Fig. 4 is a sectional view on the line 4—4 of Fig. 2.
Figure 6:
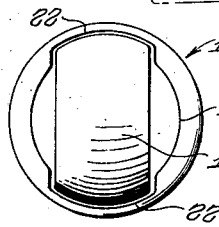
Fig. 6 is an end view illustrating the relative positions of the inner and outer bearing members in the operation of assembling them with each other.
Figure 5:
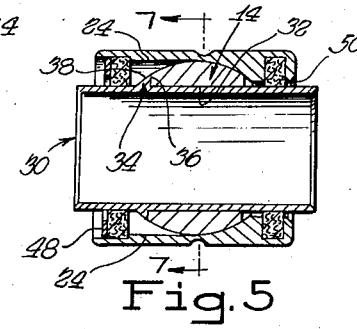
Fig. 5 is a sectional view on the line 5—5 of Fig. 2, the spindle or shaft being omitted.
Figure 8:
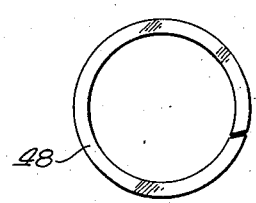
Fig. 8 is a plan view of an annular member forming a part of the bearing device.
Figure 7:
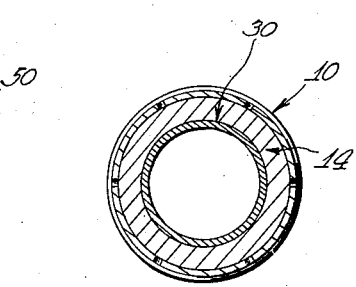
Fig. 7 is a sectional view on the line 7—7 of Fig. 5.

Referring now to the drawings in detail, the spherical bearing device of the present invention comprises an outer bearing member 10 having an inner spherically concave bearing surface 12. An inner bearing member 14 is mounted in said outer bearing member and has an outer spherically convex bearing surface 16 which is complementary to said inner bearing surface 12. Each of said bearing members is formed in one piece from steel or other suitable metal. The outer bearing member has concentric circular openings 18 and 20 at its opposite side edges, respectively, and is provided with opposed slots 22 at opening 18 to permit the insertion of inner bearing member 14 as illustrated in Fig. 6. As the manner of assembling inner and outer bearing members of this type is well known, further description in this respect is unnecessary. The inner surface of outer bearing 10 has diametrically opposite cylindrical surface portions 24 extending from the adjacent slots 22 to the line of maximum diameter of the spherical bearing surface, said cylindrical surfaces merging into the spherical surface 12 which is continuous between the grooves 26 and 28 except at said cylindrical portions 24 which are in line with and form continuations of the adjacent slots 22, respectively.

A sleeve 30 has a pressed fit in the axial opening 32 of the inner bearing member 14. An integral peripheral rib 34 is machined or otherwise formed on the surface of said sleeve. Said rib is preferably peripherally continuous and has a flat inner side edge 36 which abuts the adjacent peripheral side edge of bearing member 12, and said rib has a spherically convex surface portion 38 which is of the same radius of curvature as surface 16 and forms a continuation of said bearing surface of the inner bearing member in bearing engagement with the complementary spherical surface portions of the outer bearing member. It will be understood that the inner bearing member is first assembled with the outer bearing member and then the sleeve is inserted in the axial opening of the inner bearing member through the side of the latter which is adjacent the slots 22 of the outer bearing member. Said sleeve has a secure pressed fit into said inner bearing member. When the sleeve 30 is pressed into the inner bearing member, rib 34 engages the adjacent side edge of said inner bearing member and is thereby prevented from being driven too far into the axial opening of the inner bearing member. It will be noted also that said sleeve is thus positioned axially of the bearing device and as here shown projects equally beyond the opposite ends of the outer bearing member 10. Moreover, it will be noted that rib 34 increases the area of the spherical bearing surface of the inner bearing member.

An annular groove 40 is provided in the outer bearing member 10 and a plurality of holes 42 located in circumferentially spaced relation lead from said groove to the inner bearing surface of said bearing member. Sealing rings 44 and 46 of compressible packing material are disposed in grooves 23 and 26, respectively, and engage sleeve 30 completely therearound. A split metal washer 48 is inserted in groove 26 to cover the outer ends of slots 22. A shaft or spindle S is shown mounted in sleeve 30. Said shaft can be fixed in said sleeve or can be slidable and/or turnable in said sleeve.

The edges of the outer bearing member 10 at the openings 18 and 20 are preferably bevelled as indicated at 50 to increase the range of angular movement of inner bearing member 14, sleeve 30 which is fixed thereto, and of the shaft or spindle S.

While I have shown and described the preferred embodiment of my invention, it will be understood that various changes in the details of construction and in the arrangement of parts may be made without departing from the underlying idea or principles of this invention within the scope of the appended claims.

Having thus described my invention and illustrated its use, what I claim as new and desire to secure by Letters Patent is:

1. In a spherical bearing comprising outer and inner companion bearing members having spherically concave and spherically convex bearing surfaces, respectively, said inner bearing member having a cylindrical axial opening, a cylindrical member fitted in said inner bearing member in said cylindrical opening thereof and having an outer peripheral rib having a spherically convex outer surface portion in bearing relation to said concave surface of the outer bearing member.

2. In a spherical bearing comprising outer and inner companion bearing members having spherically concave and spherically convex bearing surfaces, respectively, said inner bearing member having a cylindrical axial opening, a cylindrical member fitted in said inner bearing member in said cylindrical opening thereof and having an outer peripheral rib having a spherically convex outer surface portion in bearing relation to said concave surface of the outer bearing member, said inner bearing member having a circular side edge and said rib on the cylindrical member having a surface abutting said circular side edge.

3. In a spherical bearing comprising outer and inner companion bearing members having spherically concave and spherically convex bearing surfaces, respectively, said inner bearing member having an axial opening, a member fitted in said axial opening and having an outer peripheral rib having a spherically convex outer surface portion in bearing relation to said concave surface of the outer bearing member.

4. In a spherical bearing comprising outer and inner companion bearing members having spherically concave and spherically convex bearing surfaces, respectively, said inner bearing member having an axial opening, a member fitted in said axial opening and having an outer peripheral rib having a spherically convex outer surface portion in bearing relation to said concave surface of the outer bearing member, said inner bearing member having a side edge and said rib on the member having a surface abutting said side edge.

5. In a spherical bearing comprising outer and inner companion bearing members having spherically concave and spherically convex bearing surfaces, respectively, said inner bearing member having an axial opening, a sleeve fitted in said inner bearing member in said opening thereof and extending axially of said inner bearing member, said sleeve having an integral outer peripheral rib positioned between the opposite ends of said sleeve in abutting relation to the adjacent side edge of said inner bearing member, said rib being disposed inwardly of the adjacent side edge of said outer bearing member and having a spherically convex surface portion in complementary bearing engagement with said concave bearing surface of said outer member.

SAMUEL COLLITO, Jr.

REFERENCES CITED

The following references are of record in the file of this patent:

UNITED STATES PATENTS

| Number | Name | Date |
| --- | --- | --- |
| 1,606,690 | Bouton | Nov. 9, 1926 |
| 1,694,438 | Chinn | Dec. 11, 1928 |
| 2,045,030 | Thompson | June 23, 1936 |
| 2,228,394 | Marvin | Jan. 14, 1941 |
| 2,309,281 | Steele | Jan. 26, 1943 |